United States Patent [19]

Hitomi et al.

[11] Patent Number: 5,125,369
[45] Date of Patent: Jun. 30, 1992

[54] INTAKE SYSTEM FOR MULTI-CYLINDER ENGINE

[75] Inventors: Mitsuo Hitomi; Toshihiko Hattori; Masashi Marubara, all of Hiroshima, Japan

[73] Assignee: Mazda Motor Corporation, Hiroshima, Japan

[21] Appl. No.: 678,462

[22] Filed: Apr. 1, 1991

[30] Foreign Application Priority Data

Mar. 30, 1990 [JP] Japan .................................. 2-91373

[51] Int. Cl.⁵ .......................................... F02M 35/10
[52] U.S. Cl. ............................ 123/52 M; 123/52 MV
[58] Field of Search ........ 123/52 M, 52 MV, 52 MC, 123/52 MB, 52 MF, 52 ML

[56] References Cited

U.S. PATENT DOCUMENTS

| 4,641,610 | 2/1987 | Rutschmann | 123/52 MV |
| 4,858,570 | 8/1989 | Matsumoto et al. | 123/52 MV |
| 4,932,378 | 6/1990 | Hitomi et al. | 123/432 |
| 4,977,865 | 12/1990 | Hiraoka et al. | 123/52 MB |
| 4,989,553 | 2/1991 | Ueda et al. | 123/52 MV |

FOREIGN PATENT DOCUMENTS 0116021 6/1986 Japan .............................. 123/52 M Primary Examiner—David A. Okonsky
Attorney, Agent, or Firm—Fish & Richardson

[57] ABSTRACT

Plural cylinders are grouped, for example, into two cylinder groups composed of plural cylinders having each inspiration stroke in an equal distance, and each of the grouped cylinder groups is communicated with a volume chamber. To this volume chamber is connected each of the independent air intake passages extending independently or separately from each of the corresponding cylinder. A first connecting portion is disposed to communicate the individual air intake passages for each of the cylinder groups with each other in a position spaced apart in an equal distance from an intake port. Further, a second connecting portion as a resonant passage is disposed to communicate one first connecting portion with the other connecting portion for each cylinder group.

24 Claims, 8 Drawing Sheets

INTAKE SYSTEM FOR MULTI-CYLINDER ENGINE

BACKGROUND OF THE INVENTION

1. Field of the Invention

The invention relates to an intake system for a multi-cylinder engine.

2. Description of Related Art

It is known that the charging efficiency is enchanced by utilizing the inertia effect or the resonance effect of intake air within an air intake system in order to improve output performance of the engine for an automotive vehicle.

In charging by taking advantage of the inertia effect, on the one hand, when the engine is in a predetermined rotational region, or in a tuning rotational region, an intake negative pressure wave of intake air generated within the air intake port in association with opening an intake valve in an initial stage of an inspiration stroke of each cylinder is spread or travelled at sound toward the upstream side along the inside of an individual air intake passage and the negative pressure wave is reversed to positive pressure wave in a predetermined volume chamber. Then, the positive pressure wave is spread or travelled in the same pathway toward the downstream side so as to reach the same air intake port immediately before the intake valve is opened, thereby forcing the intake air into the combustion chamber by means of the positive pressure wave and enchancing the charging efficiency.

In charging by taking advantage of the resonance effect, on the other hand, plural cylinders of the engine are grouped into plural cylinder groups so as to allow each of the grouped cylinders to have an equal inspiration stroke with each other. The individual air intake passages of the plural cylinders of each cylinder group are united into one merged air intake passage (resonance intake passage) at their upstream ends, and the merged air intake passage is in its predetermined position provided with a pressure-reversible section consisting of a colume chamber. A pressure wave of intake air travelling back and forth between the pressure-reversible section and each cylinder is caused to exhibit resonance within the merged air intake passage by coinciding a phase of a basic intake pressure wave generated in the air intake port of each cylinder of rhe cylinder group in a tuning rotation range of the engine with a phase of a reflection pressure wave reversed in the pressure-reversible section, thereby allowing the resonance to generate a pressure wave having a large amplitude due to a vibration of pressure generating mergedly within each cylinder. This resonance pressure wave forces the intake air into the combustion chamber of each cylinder, thereby enchancing the charging efficiency.

Japanese Patent laid-open (kokai) Publication No. 40,724/1985 proposes an intake system aiming at the inertia effect, in which an individual (independent) intake passage to be connected to each of plural cylinders is divided into two branch passages so as for one branch passage to have a passage length longer than the other, which are disposed parallel to each other and an upstream end of each of which is communicated with each of surge tanks (volume chambers) disposed independently and separately from each other, thereby allowing intake air to be tuned with inertia in both of the region in which the engine revolution is low and the region in which the number of engine revolution is high.

In the state in which the intake air is tuned with resonance, when the number of engine revolution outnumbers the number of tuning revolution and the former is made higher than the latter, the charging efficiency of the intake air is lowered due to the influence of a delay in spreading the pressure wave of intake air, thereby causing a remarkably large reduction in output torque of the engine. Hence, in such a fixed intake system as causing the resonance effect as will as the inertia effect, no inertia effect can be expected due to influence from or interference with resonance effect in the region of revolution tuning with inertia, when the tuning with resonance occurs in the region having a predetermined engine revolution and the tuning with inertia occurs in the region where the engine revolution is higher than the predetermined engine revolution, thus failing to avoid the reduction of the output torque.

SUMMARY OF THE INVENTION

Therefore, the present invention has the object to provide an improvement in an intake system capable of maintaining the inertia effect while suppressing interference with the resonance effect by changing the rotational range tuning with resonance during tuning with inertia, thereby increasing the output torque of the engine.

In order to achieve the aforesaid ogject, the present invention consists of an intake system for a multi-cylinder combustion engine, comprising:

a plurality of cylinders grouped into plural cylinder groups, each cylinder group composed of plural cylinders so grouped as for each cylinder to have an inspiration stroke apart in an equal distance;

a volume chamber disposed for each cylinder group and connected to an independent air intake passage constituting the corresponding cylinder group, an independent air intake passage extending independently and separately from each other each of the plural cylinders for the corresponding cylinder group; and a first connecting portion for each cylinder group so disposed as to allow the corresponding individual air intake passages to be communicated with each other in a position equally apart from an intake port;

wherein the first connecting portion is communicated with another first connecting portion through a second connecting section functioning as a resonant passage.

This arrangement for the intake system for the multi-cylinder conbustion engine according to the present invention allows the first connecting section to be employed as a volume chamber wherein pressure wave of intake air is reversed at the time of tuning with inertia, because the independent air intake passages for each of the cylinder groups are communicated with each other in a position spaced apart in an equal distance from the intake port, thereby achieving the inertia effect. Further, the first connecting section for one cylinder group is communicated with another first connecting section for the other cylinder group through the second connecting portion for resonance, so that a phase of the reflective pressure wave reversed by the second connecting section is brought into agreement with a phase of a basic pressure wave of intake air generated by the cylinders between the cylinder groups, thereby causing resonance of intake air to cccur within the independent air intake passage for each of the cylinder groups and consequently achieving the resonance effect. Hence, the first and second connecting portions can be employed as the volume chamber at the time of tuning with inertia as well as the conneting section at the time of tuning with resonance, so that the resonance effect to be caused due to a connection of the volume chamber to another volume chamber can be suppressed by shifting the resonance effect by the first and second connecting portions, thereby removing influence from this resonance effect and consequently increasing the inertia effect.

BRIEF DESCRIPTION OF THE DRAWINGS

FIGS. 1 to 3 are directed to a first embodiment according to the present invention, in which FIG. 1 is a top plan view showing an air intake system and the engine;

FIG. 2 is a longitudinal sectional view of FIG. 1, and

FIG. 3 is a graph showing characteristics showing a variation in output torque when an opening/closing valve is opened or closed in accordance with the number of revolutions of the engine.

FIGS. 4 and 5 are directed to a second embodiment according to the present invention, in which FIG. 4 is a plan view corresponding to FIG. 1 and FIG. 5 is a longitudinal sectional view corresponding to FIG. 2.

FIGS. 6 and 7 are directed to a third embodiment according to the present invention, in which FIG. 6 is a top plan view corresponding to FIG. 1 and FIG. 7 is a longitudinal sectional view corresponding to FIG. 2.

FIGS. 8 to 10 are directed to a fourth embodiment according to the present invention, in which FIG. 8 is a top view corresponding to FIG. 1, FIG. 9 is a longitudinal sectional view corresponding to FIG. 2 and FIG. 10 is a perspective view showing a rotary valve assembly.

DESCRIPTION OF THE PREFERRED EMBODIMENTS

The present invention will be described more in detail with reference to the accompanying drawings.

Figure 1:
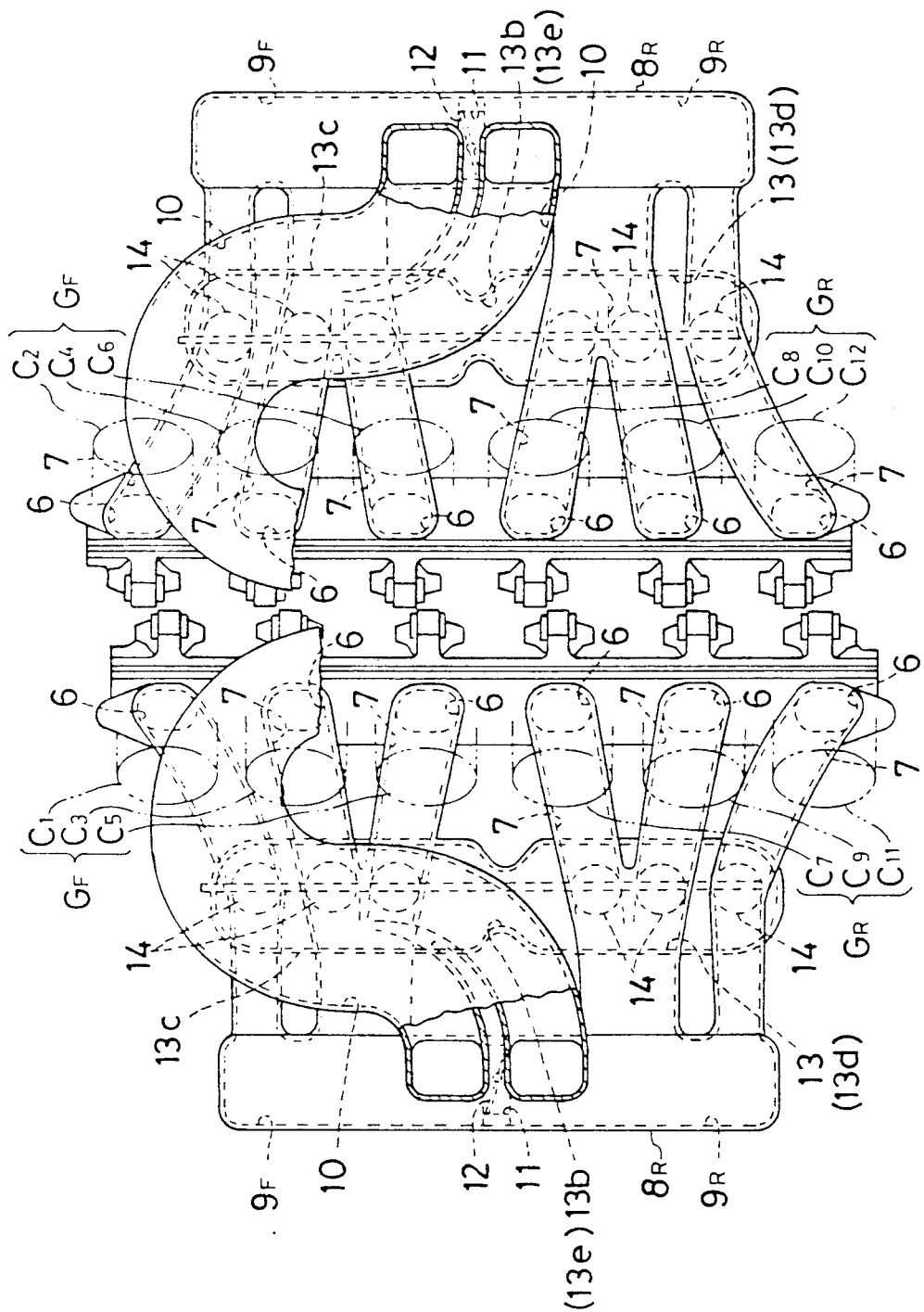
Figures 2, 3:
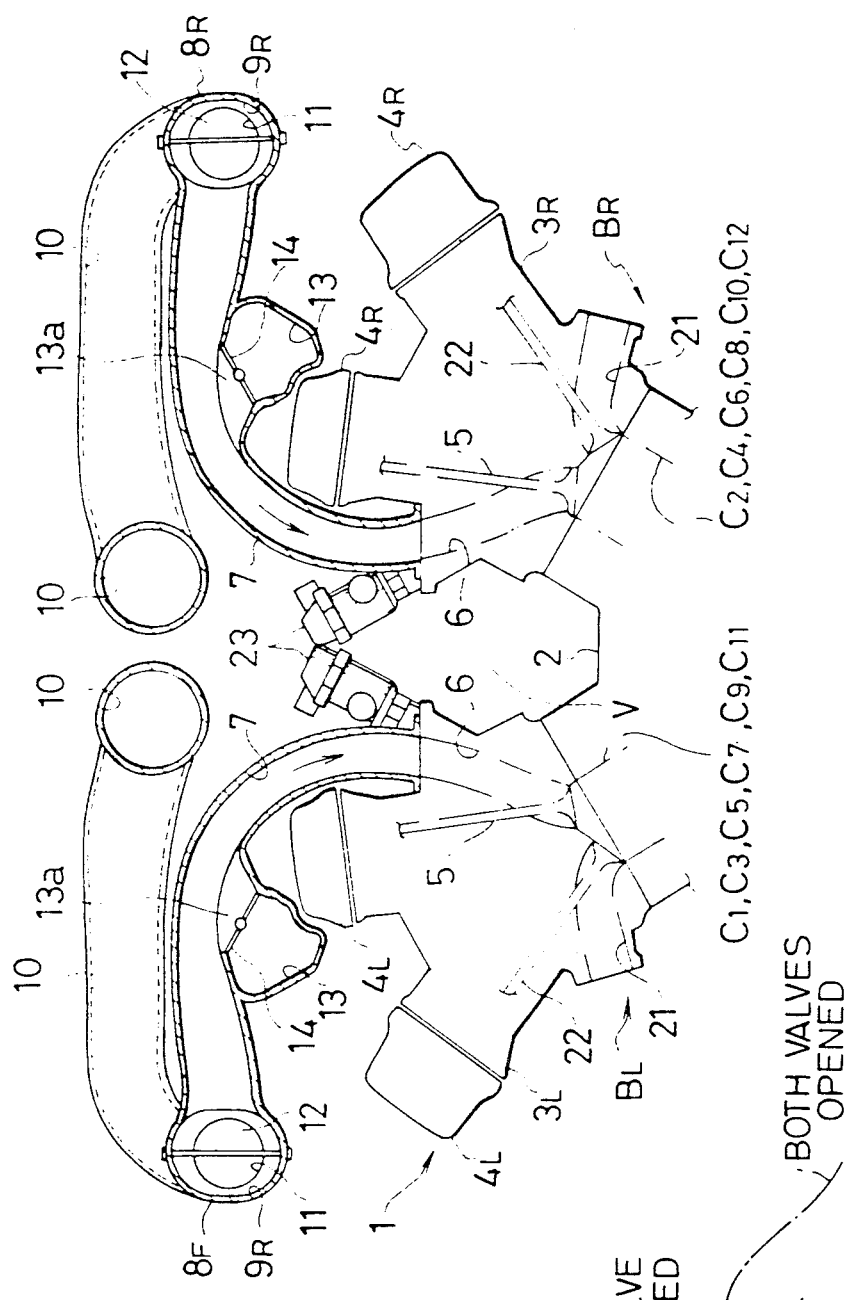

FIGS. 1 and 2 show the first embodiment in which the present invention is applied to a V-type 12-cylinder engine. Referring to FIGS. 1 and 2 reference numeral 1 denotes a V-type 12-cylinder DOHC engine having a left-hand bank BL and a right-hand bank BR. The engine 1 comprises a cylinder block 2 having a nearly V-shaped section, a right-hand cylinder head 3R, a left-hand cylinder head 3L, and two pairs of right-hand and left-hand cylinder head covers 4R and 4L. The left-hand and right-hand cylinder heads 3L and 3R are fitted together on an upper surface of the cylinder block 2, and a pair of the left-hand cylinder head covers 4L are fitted together on an upper surface of the left-hand cylinder head 3L, while a pair of the right-hand cylinder head covers 4R are fitted together on an upper surface of the right-hand cylinder head 3R. The cylinder block 2 of the left-hand bank BL (on the left-hand side in the drawing) is provided with odd-numbered cylinders including first cylinder C1, third cylinder C3, fifth cylinder C5, seventh cylinder C7, ninth cylinder C9 and eleventh cylinder C11, while the cylinder block 2 of the right-hand bank BR (on the right-hand side in the drawing) is provided with even-numbered cylinders including second cylinder C2, fourth cylinder C4, sixth cylinder C6, eighth cylinder C8, tenth cylinder C10 and twelfth cylinder C12. The odd-numbered cylinders are disposed in series in the lengthwise direction of the left-hand bank BL and the even-numbered cylinders are disposed in series in the lengthwise direction of the right-hand bank BR. These cylinders are so arranged as to proceed with an inspiration stroke in the order from the first cylinder C1 through the twelfth cylinder C12, the ninth cylinder C9, the fourth cylinder C4, the fifth cylinder C5, the eighth cylinder C8, the eleventh cylinder C11, the second cylinder C2, the third cylinder C3, the tenth cylinder C10 and the seventh cylinder C7 to the sixth cylinder C6. In this embodiment, six out of the twelve cylinders disposed on the left-hand bank BL are divided into tree cylinders constituting a front group GF (cylinder C1, cylinder C3 and cylinder C5) and another three cylinders constituting a rear cylinder group GR (cylinder C7, cylinder C9 and cylinder C11). Each of the three cylinders constituting one cylinder group is so arranged as to have an inspiration stroke in an equal distance. Likewise, three out of the six cylinders disposed on the right-hand bank BR are divided into three cylinders constituting a front cylinder group GF (cylinder C2, cylinder C4 and cylinder C6) and another three cylinders constituting a rear cylinder group GR (cylinder C8, cylinder C10 and cylinder C12). Each of the three cylinders for each cylinder group is so arranged and grouped as to have an inspiration stroke of an equal distance. Thus, in this embodiment, the cylinders of the engine 1 are divided as a whole into four cylinders groups, two cylinder groups GF and GR on the left-hand bank BL and two cylinder groups GF and GR on the right-hand bank BR.

On a side surface of the respective cylinder heads 3L and 3R between the banks BL and BR, i.e. a surface facing a V-shaped central space V of the V-bank formed between the left-hand bank BL and the right-hand bank BR, there is formed an opening of an air intake port 6 which is communicated with each of the cylinders C1 to C12 through an air intake valve 5. To each air intake port 6 is connected a downstream end of an individual air intake passage 7. Each of the individual air intake passages 7 is curved first upwards and then in a direction nearly perpendicular to the crank axis and apart from the V-shaped central space V of the V-bank so as to extend over the cylinder head 3L or 3R of the respective cylinder bank BL or BR in a nearly horizontal direction. An upper end of each individual air intake passage 7 in each cylinder group GF or GR is merged or united into one passsage which in turn is communicated with the downstream end of a volume chamber 9F or 9R for each cylinder group GF or GR, respectively.

Specifically, among the three individual air intake passages, 7, 7 and 7 constituting each of the cylinder groups GF and GR for three individual (independent) air intake passages 7 of each cylinder group GF or GR, the individual air intake passage 7 located in the middle position is merged with the other individual air intake passage 7 located on the center side (on the side adjacent the opposite cylinder group GR or GF and, in other words, on the front end side for the forward cylinder group GF and on the rear end side for the rearward cylinder group GR) and then the merged individual air intake passage 7 is communicated with the surge tank 8F or 8R. On the other hand, the remaining individual air intake passage 7 located on the end side of the cylinder group, i.e. on the front end of the forward cylinder group GF or on the rear end of the rearward cylinder group GR) is communicated solely with the surge tank 8L or 8R. More specifically, for instance, among the three individual air intake passages 7, 7 and 7 constituting the cylinder group GF, i.e. first cylinder C1, third cylinder C3 and fifth cylinder C5, the individual air intake passage 7 for the third cylinder C3 is merged with the individual air intake passage 7 for the third cylinder C5 and then the merged individual air intake passage 7 is communicated with the surge tank 8R.

Each of the surge tanks 8L and 8R is disposed parallel to the cylinder line and a downstream end of a merged air intake passage 10 is communicated with an upper face of each of the surge tanks 8F and 8R disposed in a position close to the center of the cylinder line. The merged air intake passage 10 is so curved first forwards and then gradually towards a V-shaped center space V between the left-hand bank BL and the right-hand bank BR, followed by curving further backwards so as to merge over the V-shaped center space V therebetween with another merged air intake passage 10 located on the opposite side. An upstream end of the merged air intake passage 10 is communicated with a throttle casing (not shown). For each of the left-hand bank BL and the right-hand bank BR, the forward volume chamber 9F is communicated with the rearward volume chamber 9R through a connecting passage 11, i.e. third connecting passage, which functions as a passage for resonance and which is provided with an opening-closing valve 12 comprised of a butterfly valve, which functions as a second opening-closing valve. The sectional opening area of the connecting passage 11 is set to be so smaller than that of each of the volume chambers 9F and 9R that the equivalent passage length is rendered long. By opening or closing the opening-closing valve 12, a section for reversing the intake pressure wave by means of the resonance effect is shifted to a merged section of the merged air intake passage 10 and 10 or the connecting passage 11, thereby making the number of revolutions tuning with resonance variable.

Underneath each of the individual air intake passages 7 is disposed a connecting passage 13 extending parallel to the cylinder line, which communicates all the three individual air intake passages 7 for each of the cylinder group GF and GR through connecting apertures 13a, 13a and 13a, respectively. Each of the connecting apertures 13a has an opening spaced apart in an equal distance from the air intake port 6 and all the three individual air intake passages 7, 7 and 7 for each of the cylinder groups GF and GR are communicated through the connecting passage 13 with each other in the respective positions spaced equally apart from the air intake port 6. The connecting passage 13 (indicated by 13c in FIG. 1) for the forward cylinder group GF in each of the left-hand and right-hand cylinder lines is further communicated with the connecting passage 13 (indicated by 13d in FIG. 1) for the rearward cylinder group GR in the same cylinder line. Furthermore, the two connecting passages 13 are provided at its middle portion with a smaller-sized section 13b (or a restrictor) which is smaller in sectional opening area than the remaining portion. In other words, the connecting passage 13 comprises the first connecting portion 13c or 13d and the second connecting portion 13e as a passage causing resonance, the first connecting portion 13c communicating the individual air intake passages for the forward cylinder group GF with the individual air intake passages for the rearward cylinder group GR and the second connecting portion 13e communicating the first connecting portion 13c with another first connecting portion 13d. The sectional area of the second connecting portion 13e is disposed smaller than each of the first connecting portions 13c and 13d, thereby rendering the equivalent passage length of the second connecting portion 13e long.

An opening-closing valve 14, as a first opening-closing valve, is so mounted as to open or close each of the connecting apertures 13a in synchronization with each other. By opening or closing each of the valves 14, a section for reversing the intake pressure wave by the inertia effect is shifted to the volume chamber 9F and 9R within the surge tank 8L or 8R or to the connecting passage 13, thereby making the number of revolutions tuning with the inertia variable and shifting the section for reversing the pressure wave by the resonant effect between the two connecting passages 11 and 13 (second connecting section 13e).

In FIG. 2, reference numeral 21 denotes an exhaust port to be opened or closed by an exhaust valve 22 and reference numeral 23 denotes an injector.

Description will now be made on the action or operation of the embodiments.

The opening-closing valve 12 mounted in the connecting passage 11 within each of the surge tanks 8L and 8R for the respective cylinder groups GF and GR is opened or closed in accordance with the region in which the number of engine revolution varies. Likewise, the opening-closing valve 14 mounted within each of the connecting passage 13 is opened or closed in accordance with the region of the number of engine revolution. In other words, the opening-closing valves 12 and 14 are both closed when the engine 1 exists in the region in which the number of engine revolution is low so that a merged portion on the upstream side of each of the merged air intake passages 10 and 10 corresponding to the cylinder groups GF and GR works as a section where the intake pressure wave is reversed, thereby causing tuning with resonance and producing a torque characteristic as indicated by the solid line in FIG. 3. When the engine 1 exists in the region in which the number of engine revolution is intermediate, only the opening-closing valve 12 interposed between the surge tanks 8L and 8R is opened while each of the opening-closing valves 14 for the connecting passage 13 is closed, thereby allowing the connecting passage 11 interposed between the volume chambers 9F and 9R to work as a section for reversing the intake pressure wave, thereby achieving a torque characteristic as indicated by the broken line in FIG. 3.

When the engine 1 raises its number of revolutions and enters the region in which the number of engine revolution is high, both of the opening-closing valves 12 and 14 are opened. In this case, as each of the independent air intake passage 7 for each of the cylinder groups GF and GR are communicated with each other in a position spaced apart in an equal distance from the intake port 6, the connecting passage 13 serves as a section in which the pressure wave of intake air is reversed at the time of tuning with inertia, thereby achieving the inertia effect. Further, as the independent air intake passages 7 are communicated with each other between the cylinder groups GF and GR, the connecting passage 13 allows the intake air to cause resonance within the independent air intake passages 7 for each of the cylinder groups GF and GR, because the phase of a basic pressure wave of the intake air created by the cylinders between the cylinder groups GF and GR is caused to coincide with the phase of a reflective pressure wave reversed in the connecting passage 13, thereby achieving the resonance effect. This resonant effect suppresses the resonant effect to be produced by the connecting passage 11 disposed between the volume chambers 9F and 9R and increases the inertia effect, thereby achieving the torque characteristic as indicated by one-dotted chain line in FIG. 3. It is to be noted herein that the number of revolutions tuning with resonance in sa resonant supercharging is set so as to coincide substantially with the number of revolutions tuning with inertia in an inertia supercharging.

Description will now be made of other embodiments according to the present invention.

Figure 4:
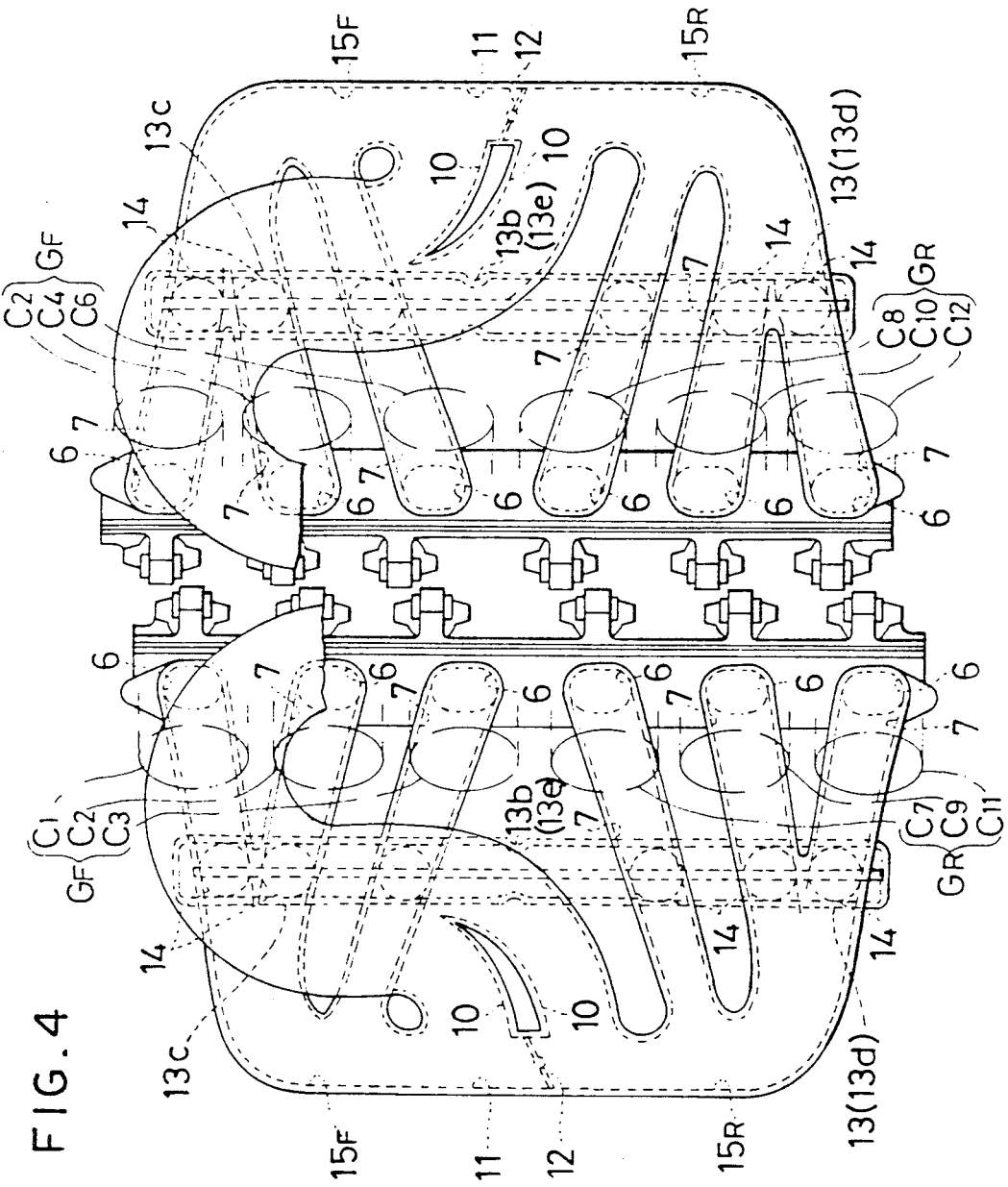
Figure 5:
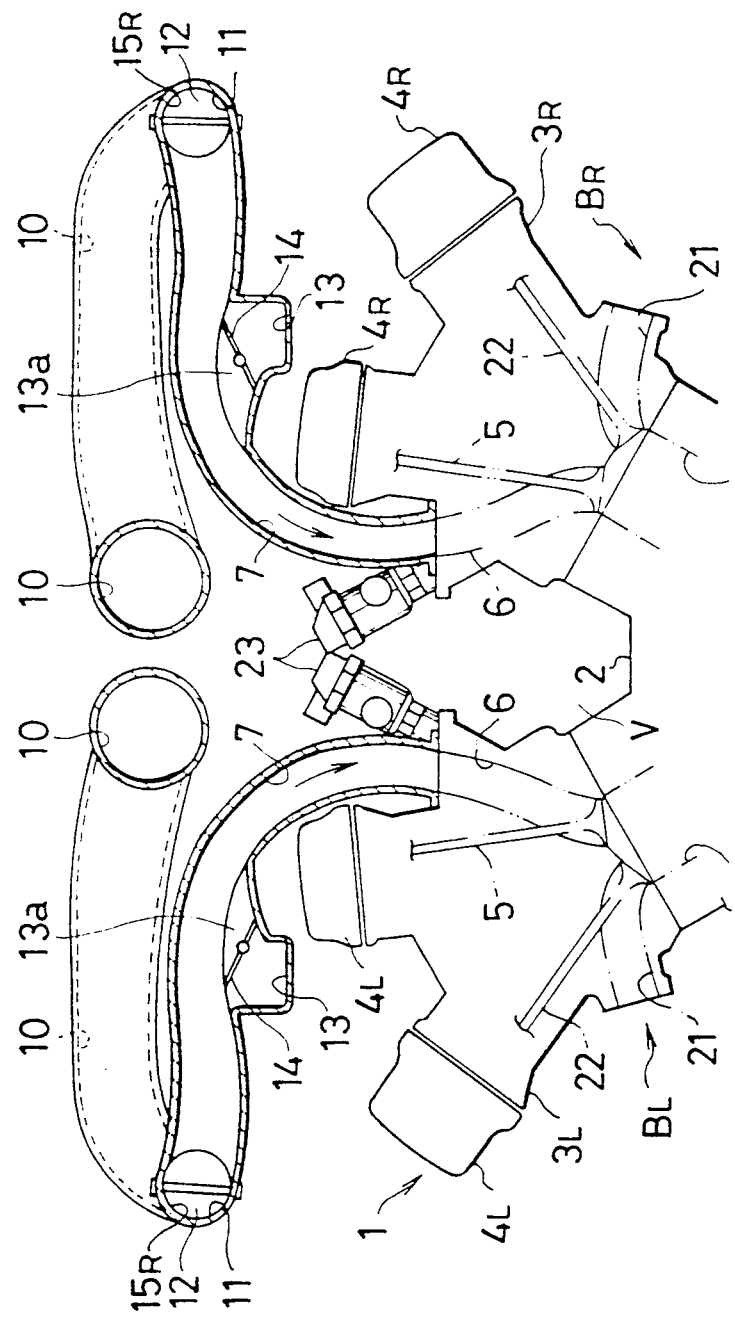

FIGS. 4 and 5 are directed to the second embodiment for the intake system for the multi-cylinder combustion engine according to the present invention. The identical and like elements are provided with the identical reference numerals and symbols as in FIGS. 1 and 2 and description on those identical and like elements will be omitted from the following description. In this embodiment, a shape of the volume chamber is modified. In this embodiment, each of the upstream ends of the independent air intake passage 7 for the forward cylinder group GF is communicated with a merged section 15F as a volume chamber, not with the volume chamber 9F within the corresponding surge tank 8L or 8R. Likewise, each of the upstream ends of the independent air intake passages 7 for the rearward cylinder group GR is communicated with a merged section 15R as a volume chamber, not with the volume chamber 9R within the corresponding surge tank 8L or 8R. Each of the merged sections 15F and 15R is communicated with the respective merged air intake passages 10 and 10. The other elements are substantially the same as the first embodiment as described hereinabove. It is to be noted that the second embodiment can achieve substantially the same effects as the first embodiment.

Figure 6:
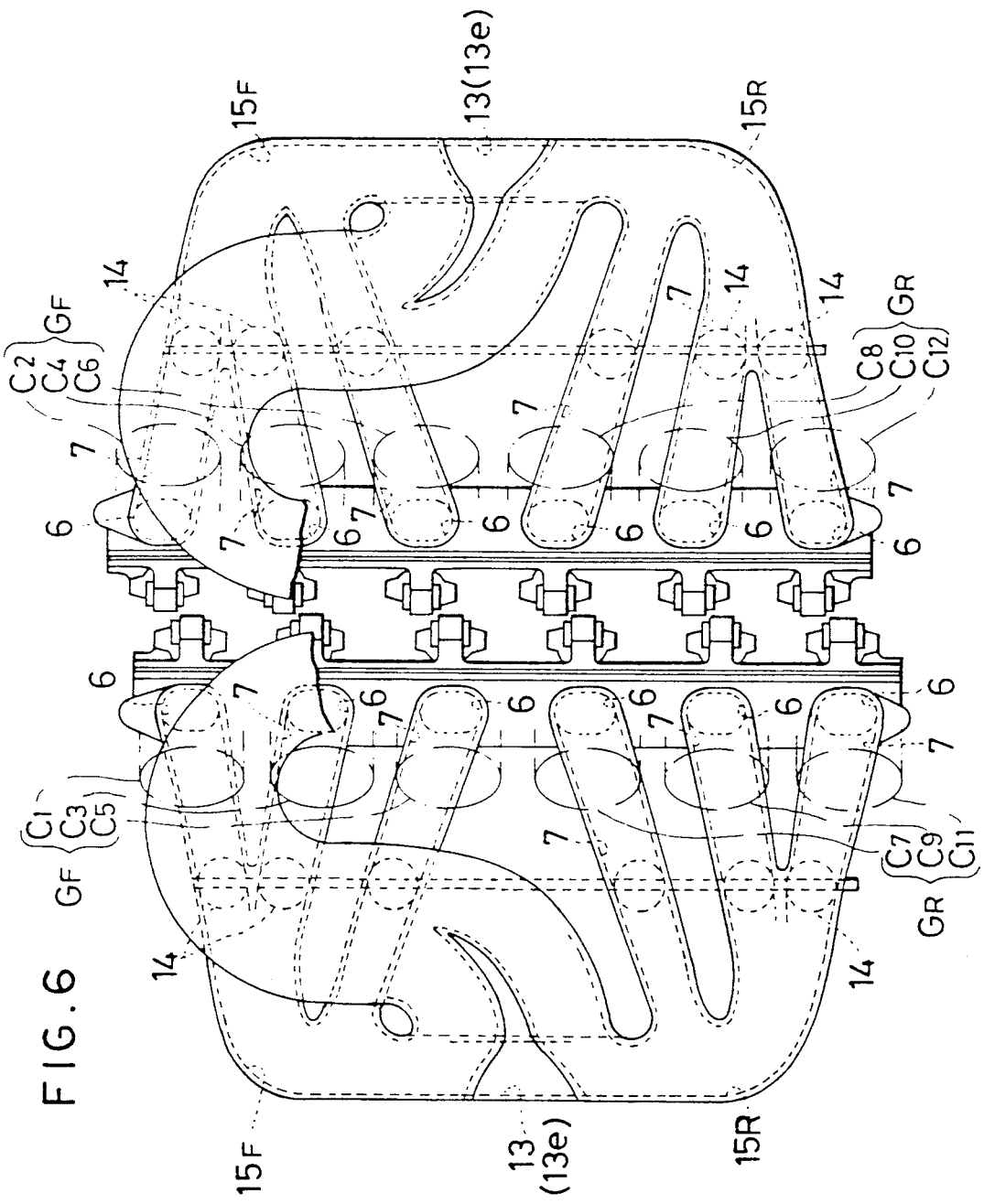
Figure 7:
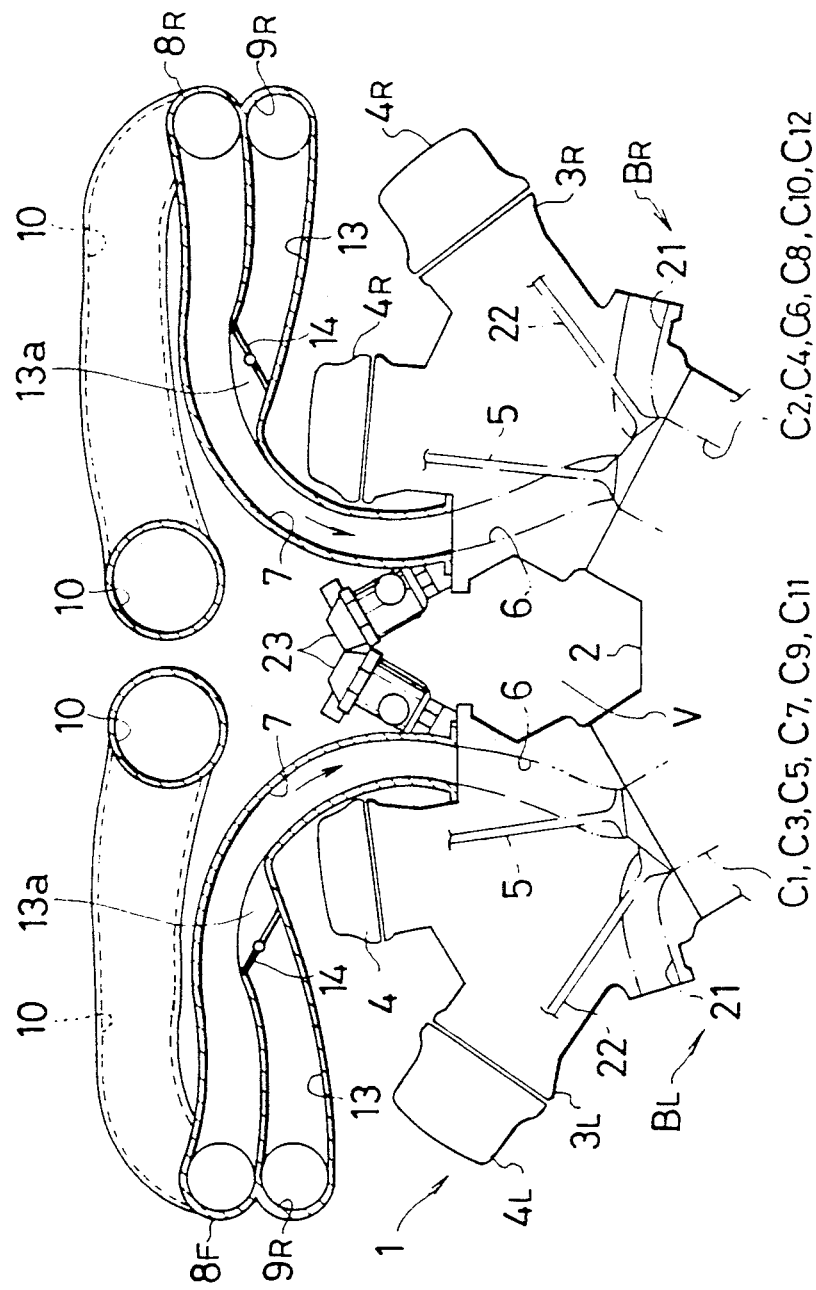

FIGS. 6 and 7 are directed to the third embodiment, in which the length of the connecting passage 13 communicating each of the independent air intake passages 7 for the forward cylinder group GF to each of the independent air intake passages 7 for the rearward cylinder group GR is varied from that in the first embodiment.

In this embodiment, as shown in FIGS. 6 and 7, the independent air intake passages 7 for the forward cylinder group GF are communicated with the merged air intake passage 10 through the merged section 15F while the independent air intake passages 7 for the rearward cylinder group GR are communicated with the merged air intake passage 10 through the merged section 15R. Further, the connecting passage 13 communicating the independent air intake passages 7 between the cylinder groups GF and GR on the left-hand cylinder bank BL is disposed so as to extend underneath and parallel to the merged sections 15F and 15R in the longitudinal direction along which the cylinder bank extends, and then branched off. An end of each of the branched portions is communicated with each of the corresponding independent air intake passages 7 through a communicating aperture 13a in a position spaced apart in an equal distance from the intake port 6, the connecting aperture 13a being so constructed as to be opened or closed by the opening-closing valve 14.

In this embodiment, the passage length of the connecting passage 13 (13e) is rendered so long as achieving substantially the same effects as in the first embodiment wherein the sectional opening area in the middle portion of the cnp 13 is made smaller than the other portions. Further, the connecting passage 13 in this case functions as a section for reversing the pressure wave by taking advantage of the resonant effect.

Figure 8:
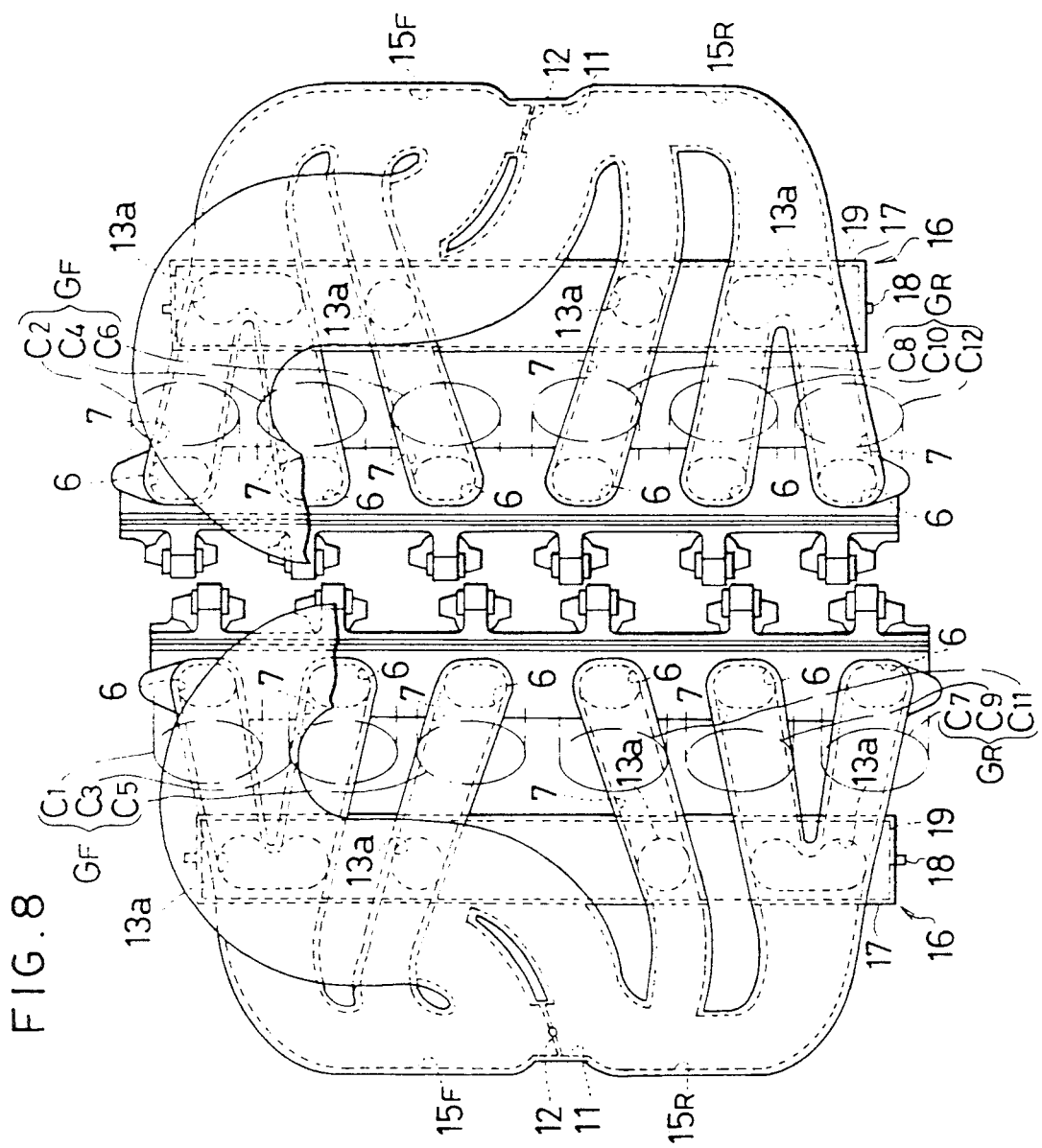
Figure 10:
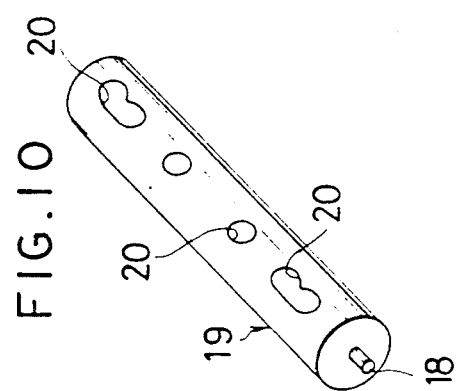
Figure 9:
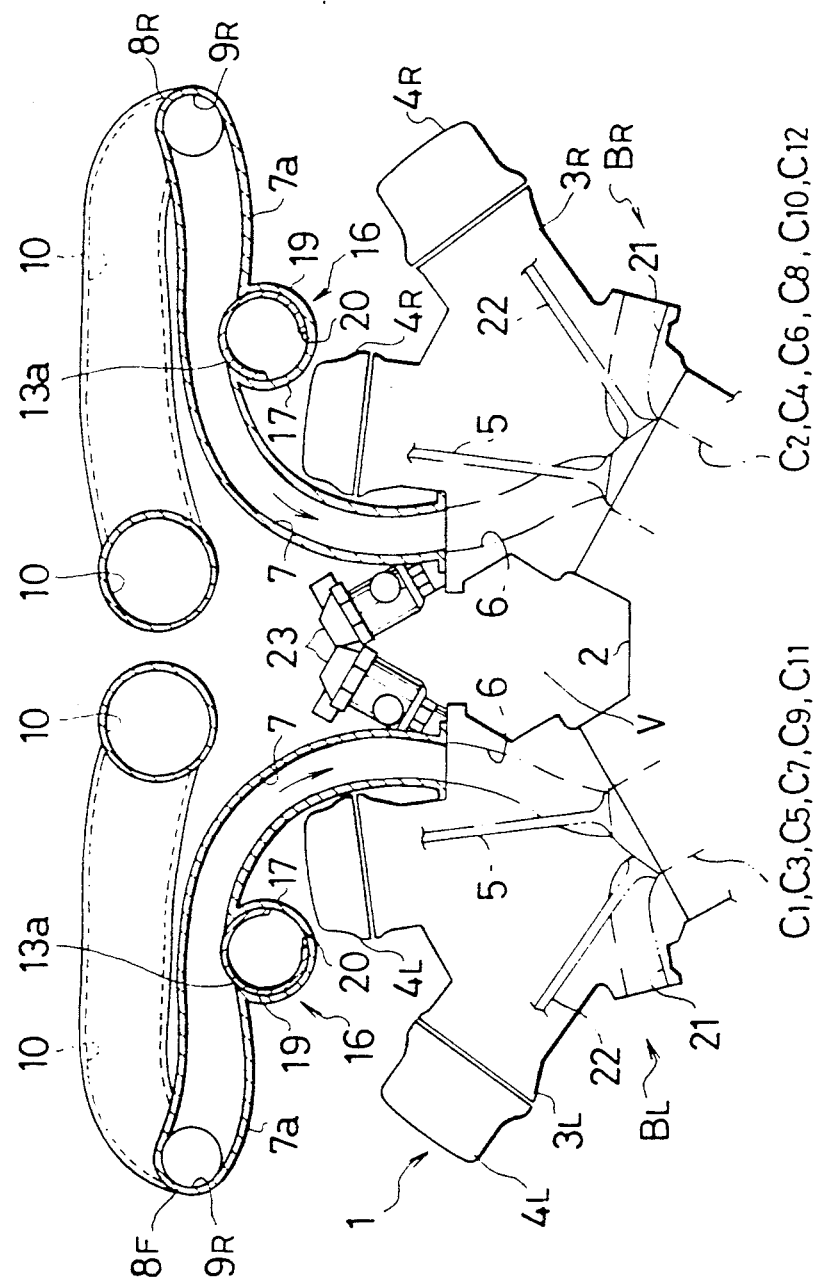

FIGS. 8 to 10 are directed to the fourth embodiment, in which the rotary valve 16 is employed as connecting means.

This embodiment is substantially the same as the second embodiment, as shown in FIGS. 4 and 5, except for the mounting of the rotary valve 16, as the connecting means, underneath the independent air intake passages 7 for the forward and rearward cylinder groups GF and GR for each of the cylinder banks BL and BR. As specifically shown in FIG. 9, the rotary valve 16 is composed of a cylindrical casing 17 so formed integrally with an intake tube 7a of each of the independent air intake passages 7 as to extend over the entire length of the juxtaposition of all the independent air intake passages 7 for the cylinder groups GF and GR, i.e. ranging from the front end of the far front independent air intake passage 7 to the rear end of the far rear independent air intake passage 7, in parallel to the cylinder line for each of the left-hand and right-hand bank BL and BR. The casing 17 is communicated with each of the independent air intake passage 7 through a connecting aperture 13a having an opening in a position spaced apart in an equal distance from the intake port 6. As shown in FIG. 10, a closed cylindrical valve member 19 is rotatably supported by a support shaft 18 and inserted into the casing 19 which in turn is provided with apertures 20 so as to communicate the inside of the valve casing with the outside thereof. The valve apertures 20 are so disposed as to be parallel to the rotary axis of the valve member 19 and as to correspond to each of the connecting apertures 13a. The rotation of the valve member 19 can allow all the valve apertures 20 to correspond to all the connecting apertures 13a, thereby allowing simultaneous communication of all the three independent air intake passages 7 for the forward cylinder group GF with each other and all the three independent air intake passages 7 for the rearward cylinder group GR with each other as well as communication of all the three independent air intake passages 7 for the forward cylinder group GF with all the three independent air intake passages 7 for the rearward cylinder group GR.

Thus, in this embodiment, when each of the valve apertures 20 is allowed to agree with each of the corresponding connecting apertures 13a of the casing 17 by rotating the valve member 19 of the rotary valve 16 about the support shaft 18, all the valve apertures 20 are communicated with the connecting apertures 13a, thereby opening the rotary valve 16 and simultaneously communicating all the independent air intake passages 7 for the left-hand cylinder group GF with each other and all the independent air intake passages 7 for the right-hand cylinder group GR with each other as well as all the three independent air intake passages 7 for the left-hand cylinder group GF with all the three independent air intake passages 7 for the right-hand cylinder group GR. Thus, the fourth embodiment can achieve substantially the same effects as the other embodiments.

Although the above description is made of the V-type 12-cylinder engine 1, it is to be understood as a matter of course that the present invention can be applied to other multi-cylinder engines including inline 4-cylinder engine, inline 8-cylinder engine, V-type 8-cylinder engine and so on.

What is claimed is:

1. An intake system for a multi-cylinder combustion engine, comprising:
   a plurality of cylinders grouped into plural cylinder groups such that the cylinders in each cylinder group are equal in timing of intake stroke;
   a volume chamber disposed for each cylinder group; and connected to an independent air intake passage (7) constituting the corresponding cylinder groups
   an independent air intake passage extending independently from each cylinder of each cylinder group and communicating with the respective volume chamber; and
   a first connecting portion for each cylinder group disposed to communicate between the corresponding individual air intake passages of the cylinder group at a position equally apart from an intake port;
   wherein the first connecting portion of one cylinder group communicates with the first connecting portion of another cylinder group through a second connecting section functioning as a resonant passage.

2. An intake system as claimed in claim 1, further comprising a merged air intake passage having a downstream end which communicates with the volume chamber of one cylinder group, wherein an upstream end of the merged air intake passage for the one cylinder group is merged with an upstream end of another merged air intake passage for another cylinder group.

3. An intake system as claimed in claim 2, wherein:
   the volume chamber for the one cylinder group is communicated with another volume chamber for another cylinder group through a third connecting section which acts as a resonant passage; and
   a first opening-closing valve is mounted for opening or closing a connection between each of the independent air intake passages and the first connecting portion.

4. An intake system as claimed in claim 3, wherein a second opening-closing valve is mounted within the third connecting section.

5. An intake system as claimed in claim 3, wherein:
   the first opening-closing valve and the second opening-closing valve are closed in an engine operation region in which the number of engine revolutions is low;
   the first opening-closing valve is closed and the second opening-closing valve is opened in an engine operation region in which number of engine revolutions is intermediate; and
   the first opening-closing valve and the second opening-closing valve are opened in an engine operation region in which the number of engine revolutions is high.

6. An intake system as claimed in claim 2, wherein the volume chamber communicates with another volume chamber through a third connecting section which acts as a resonant passage.

7. An intake system as claimed in claim 1, wherein a sectional area of the second connecting section is smaller than a sectional area of each of the first connecting portions.

8. An intake system as claimed in claim 1, wherein each of the volume chambers is disposed as an inner space of a surge tank.

9. An intake system as claimed in claim 1, wherein: an even number of four or more cylinders for a cylinder head are disposed parallel to each other along the cylinder head;
   the cylinders are disposed in each cylinder head are grouped into two cylinder groups each having an equal number of cylinders.

10. An intake system as claimed in claim 9, wherein:
    one of the cylinder groups is composed of the cylinders diposed in a position close to one end of the cylinder head in a direction parallel to a crank axis; and
    the other of the cylinder groups is composed of the cylinders disposed in a position close to the other end of the cylinder head in the direction parallel to the crank axis.

11. An intake system as claimed in claim 9, wherein:
    an intake port has an opening facing one side surface of the cylinder head; and
    the independent air intake passage extending from the intake port is so disposed as to extend upward from the one side surface of the cylinder head and then over the cylinder head toward the other side thereof.

12. An intake system as claimed in claim 11, wherein the first connecting portion and the second connecting section are positioned over the cylinder head and underneath the independent air intake passage.

13. An intake system as claimed in claim 6, wherein a first opening-closing valve is mounted for opening or closing a connection of each of the independent air intake passages and the first connection portion.

14. An intake system as claimed in claim 13, wherein the first connecting portion (13c, 13d), the second connecting section and the first opening-closing valve comprise a rotary valve (16).

15. An intake system as claimed in claim 14, wherein the rotary valve comprises:
    a casing communicating with each of the independent air intake passages; and
    a hollow valve member accommodated rotatably within the casing and having an opening located in a predetermined position of an outer peripheral surface.

16. An intake system as claimed in claim 9, wherein:
    the multi-cylinder combustion engine is a V-type combustion engine comprising left-hand and right-hand cylinder heads; and
    each of the left-hand and right-hand cylinder heads is provided with two cylinder groups.

17. An intake system as claimed in claim 16, wherein:
    two cylinder groups disposed on the left-hand cylinder head are provided with corresponding volume chambers, first connecting portions, and a second connecting section communicating between the corresponding volume chambers; and
    two cylinder groups disposed on the right-hand cylinder head are provided with corresponding volume chambers, first connecting portions, and a second connecting section communicating between the corresponding volume chambers.

18. An intake system as claimed in claim 17, further comprising:
    a left-hand merged air intake passage having downstream ends connected to the volume chambers of the left-hand cylinder head and having an upstream end which is merged;
    a right-hand merged air intake passage having downstream ends connected to the volume chambers of the right-hand cylinder head and having an upstream end which is merged;
a first opening-closing valve disposed to open or close a connection between each of the independent air intake passages for the left-hand cylinder head and a first connecting portion; and
a first opening-closing valve disposed as to open or close a connection between each of the independent air intake passages for the right-hand cylinder head and a first connecting portion.

19. An intake system as claimed in claim 18, wherein:
the volume chambers for the left-hand cylinder head communicate through a third connecting section which acts as a resonant passage, the third connecting section being provided with a second opening-closing valve; and
the volume chambers for the right-hand cylinder head communicate through a third connecting section which acts as a resonant passage, the third connecting section being provided with a second opening-closing valve.

20. An intake system as claimed in claim 19, wherein:
the first opening-closing valve and the second opening-closing valve are closed in an engine operation region in which the number of engine revolutions is low;
the first opening-closing valve is closed and the second opening-closing valve is opened in an engine operation region in which number of engine revolutions is intermediate; and
the first opening-closing valve and the second opening-closing valve are opened in an engine operation a region in which the number of engine revolutions is high.

21. An intake system as claimed in claim 17, further comprising:
intake ports for each of the left-hand cylinder head and the right-hand cylinder head having an opening facing a V-shaped space formed between the left-hand cylinder head and the right-hand cylinder head;
wherein each of the independent air intake passages for the left-hand cylinder head is so disposed as to extend upwards and then over the left-hand cylinder head in a direction remote from the V-shaped central space; and
wherein each of the independent air intake passages for the right-hand cylinder head is so disposed as to extend upwards and then over the right-hand cylinder head in a direction remote from the V-shaped central space.

22. An intake system as claimed in claim 21, wherein:
the first connecting portion for the left-hand cylinder head is located underneath the independent air intake passages for the left-hand cylinder head and over the left-hand cylinder head;
the second connecting portion for the left-hand cylinder head is located underneath the independent air intake passages for the left-hand cylinder head and over the left-hand cylinder head;
the first connecting portion for the right-hand cylinder head is located underneath the independent air intake passages for the right-hand cylinder head and over the right-hand cylinder head; and
the second connecting portion for the right-hand cylinder head is located underneath the independent air intake passages for the right-hand cylinder head and over the left-hand cylinder head.

23. An intake system as claimed in claim 6, wherein a sectional opening area of the third connecting portion is set to be smaller than that of each of the volume chambers.

24. An intake system as claimed in claim 1, wherein:
the engine revolution tuning with inertia in supercharging by taking advantage the first connecting portion as a section for reversing a pressure wave is set to agree substantially with the engine revolution tuning with resonance in supercharging by taking advantage the second connecting portion as a resonant passage.

* * * * *